United States Patent
Beattie

[11] 3,893,776
[45] July 8, 1975

[54] FASTENING APPARATUS FOR PLAYGROUND EQUIPMENT AND METHOD OF ASSEMBLY

[75] Inventor: John M. Beattie, Bloomington, Minn.

[73] Assignee: The Toro Company, Minneapolis, Minn.

[22] Filed: Jan. 8, 1974

[21] Appl. No.: 431,612

[52] U.S. Cl. .................. 403/259; 29/432; 29/526; 182/228; 256/65; 285/40; 403/195; 403/261
[51] Int. Cl.[2] .................................... F16L 5/00
[58] Field of Search ......... 287/DIG. 7; 285/40, 323; 182/220, 228; 403/195, 240, 243, 259, 261, 343, 344, 370, 371; 272/56.5 R, 60 R, 62, 63, 85; 211/123; 52/753 L, 32 V; 85/33; 151/19 R; 29/432, 526

[56] References Cited
UNITED STATES PATENTS

| | | | |
|---|---|---|---|
| 1,405,342 | 1/1922 | Shaffer | 403/344 |
| 1,562,675 | 11/1925 | Baker | 285/40 |
| 1,588,606 | 6/1926 | Oden | 285/40 |
| 1,607,273 | 11/1926 | Hecht | 151/19 R |
| 2,475,042 | 7/1949 | McCloskey | 403/370 |
| 2,789,458 | 4/1957 | Skeisvoll | 85/33 |
| 3,814,416 | 6/1974 | Munger et al. | 272/63 |

FOREIGN PATENTS OR APPLICATIONS
74,737   12/1946   Denmark.......................... 52/753 L

*Primary Examiner*—Richard J. Scanlan, Jr.
*Assistant Examiner*—Conrad L. Berman
*Attorney, Agent, or Firm*—Merchant, Gould, Smith & Edell

[57] ABSTRACT

Apparatus for fastening bar members to wooden post members for use as a basic unit in constructing playground equipment. A pair of support plates are placed on opposite sides of a clearance hole in the post member. Each support plate has a guide hole axially aligned with the clearance hole. A pair of internally threaded split rings threadedly engage the bar member. The external surface of a portion of each split ring is a conical section sized to engage the guide hole of one of the support plates on a tapered surface. Fastening is achieved by rotating the split rings on opposite sides to thread each toward the post member center. In an alternate embodiment, a segmented externally threaded sleeve is fixed to the bar member on each side of the post member so that the sleeve extends into the clearance hole, and a conventional nut is threaded onto the sleeve to engage the respective support plates.

13 Claims, 5 Drawing Figures

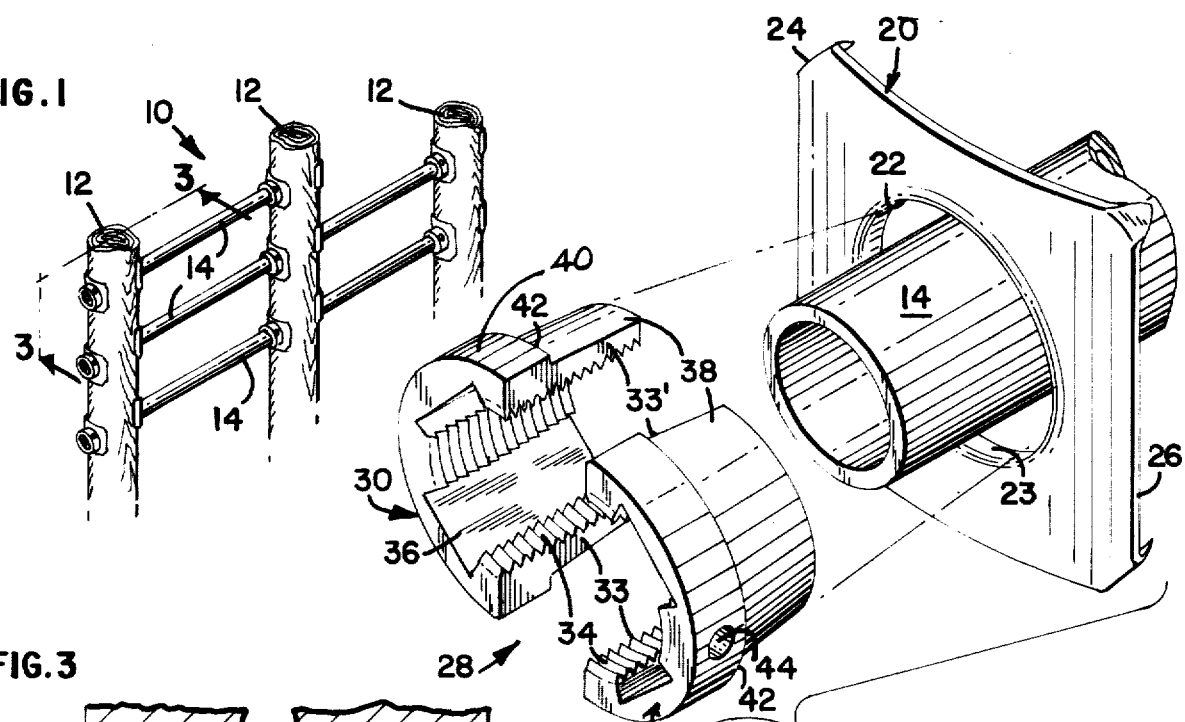
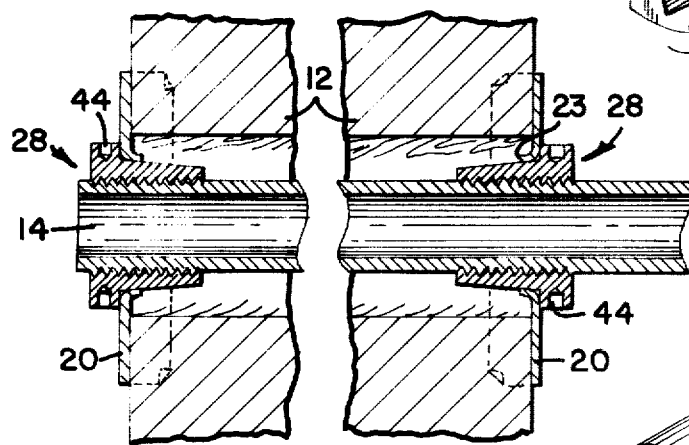
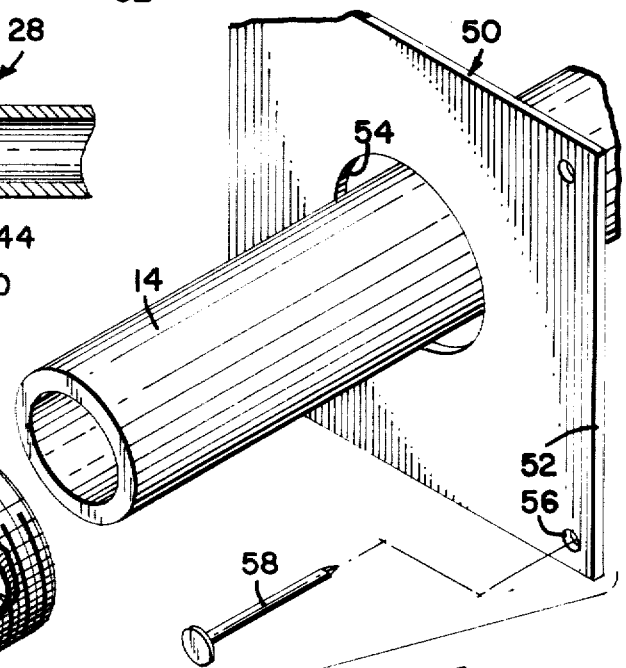
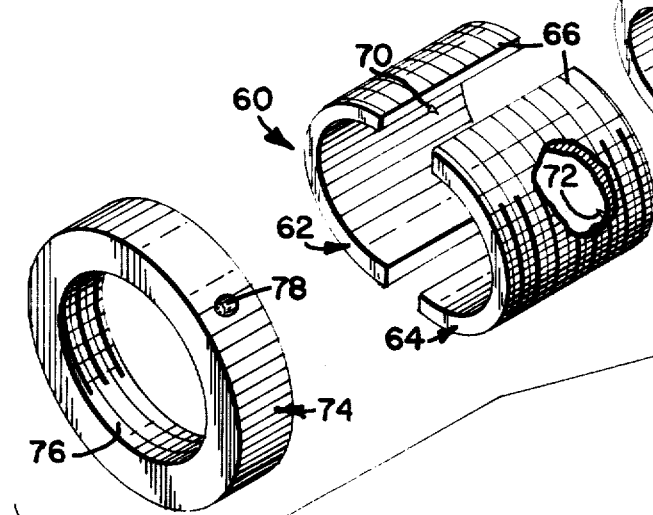
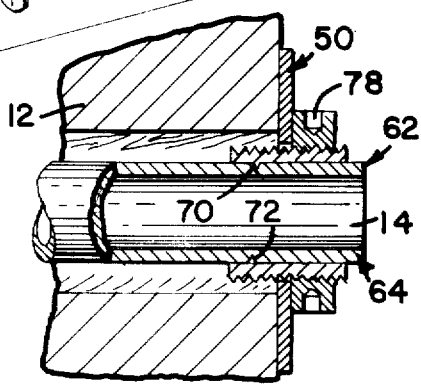

FASTENING APPARATUS FOR PLAYGROUND EQUIPMENT AND METHOD OF ASSEMBLY

BACKGROUND OF THE INVENTION

This invention pertains generally to playground equipment. More specifically, it concerns a basic unit of construction and a method for fastening individual members of playground equipment to one another to construct a recreational structure for climbing and other gymnastic uses.

In conventional playground equipment of the type using compressible post members, such as wooden posts, and bar members, such as steel pipes, a number of problems in fastening and construction are encountered. Conventional fastening means require the use of a pin or lag bolt connection extending through the post member, bar member or both. Such construction requires drilling at the assembly site, which, in the case of playground equipment, is a site where power for the drilling operation is not readily available. In addition, connecting collars and other connecting apparatus must usually be strung on the bar members in the proper order for assembly long before the actual individual fastening connections are made. Frequent errors resulting from omission of connecting collars or other elements, or stringing large numbers of elements in improper order can result in frustration and loss of time in setting up the equipment.

The present invention provides a basic unit of construction and a method of fastening compressible post members and bar members to one another which places the post members in compression to improve structural integrity, while at the same time substantially decreasing the need for stringing parts on the bar members prior to assembly. It also provides a method of assembly in which on-site drilling is not a necessity.

It is therefore an important object of the present invention to provide a basic unit of construction and method of fastening for use in playground equipment in which the need for on-site drilling to provide individual connections is eliminated.

Another important object is to provide a basic unit of construction and method for fastening wooden post members and bar members to one another for use in playground equipment in which wooden members are placed in compression at the fastening point.

A further object of the invention is to provide basic units of construction of use in playground equipment and a method of fastening elements of playground equipment together in which the need for stringing fastening elements on individual members is kept to a minimum.

SUMMARY OF THE INVENTION

These and other objects are attained by use of a basic unit of construction in which a compressible post member having a clearance hole through it is associated with a bar member. The bar member extends completely through the post member. Fixed means engage one side of the post member and bar member, preventing the bar member from being drawn toward the opposite side of the post member. A support plate is placed in contact with the opposite side of the post member. The support plate has a guide hole which is axially aligned with the clearance hole in the post member. Split ring means are internally threaded to engage the bar member. The outer surface of the split ring means bears against the support plate at the periphery of the guide hole. Rotation of the split ring means in the proper sense causes the split ring to tighten in the guide hole and to thread the pipe. This creates a tension force on the bar member, and correspondingly compresses the post member between the fixed means and the support plate. Use of the split ring means substantially decreases the amount of stringing of connective members required to construct a unit. In addition the construction may be accomplished without the on-site drilling for lag bolts, pins or other connective elements.

BRIEF DESCRIPTION OF THE DRAWINGS

Referring particularly to the drawings, in which like characters indicate like parts throughout the several views:

FIG. 1 is a perspective view of simple playground equipment incorporating the basic apparatus of and using the method of the present invention in several places;

FIG. 2 is an enlarged exploded perspective view of a portion of the apparatus of the invention incorporated into FIG. 1, also serving to illustrate the inventive method of fastening;

FIG. 3 is a sectional view taken generally along the line 3—3 of FIG. 1, portions thereof being broken away;

FIG. 4 is an exploded perspective view similar to that of FIG. 2 showing an alternative embodiment of the present invention; and FIG. 5 is a sectional view, similar in nature to FIG. 3, of the structure shown in FIG. 4.

While the invention will be described in connection with preferred embodiments and a method, the invention is not limited in scope to those embodiments or that method. On the contrary, all alternatives, modifications and equivalents included within the spirit and scope of the invention as defined by the appended claims are covered.

DETAILED DESCRIPTION OF THE INVENTION

Turning first to FIG. 1, there is shown a simplified piece of playground equipment generally designated 10. Playground equipment 10 is comprised of a plurality of vertical compressible post members 12, each of which may be constructed using wood or another somewhat compressible material. Interconnected between and through post members 12 are three bar members 14. Bar members 14 may be fabricated from any bar-like material with sufficient structural integrity to withstand the forces exerted by persons using it for exercise. As an example, one inch circular galvanized steel pipe has been found acceptable for use as bar members. Bar members 14 extend completely through compressible post members 12 through clearance holes 18 shown in FIG. 3.

In each instance where a bar member emerges from a clearance hole 18 in one of the post members 12, a support plate 20 is provided adjacent to and in contact with post member 12. Each support plate 20 has a guide hole 22 therein through which an associated bar member may extend. Guide hole 22 may be provided with an inwardly formed lip 23. Support plates 20 may include a means for maintaining the guide hole 22 in axial alignment with its associated clearance hole 18. This may be, as is shown in FIG. 2, a plurality of tines or projections 24 formed by bending over the individual corners of the plate 20. Support plate 20 will preferably have a inner surface 26 generally conforming to the shape of post member 12 in the area surrounding its clearance hole 18. In this manner, forces exerted in the immediate vicinity of guide hole 22 may be distributed over a larger portion of compressible post member 12 to prevent crushing and deterioration thereof.

Split ring means generally designated 28 includes a pair of half round segments 30 and 32. While the embodiment shown in FIG. 2 shows split ring means 28 comprised of a pair of segments, a greater number of segments might well be used. Segments 30, 32 have pairs of mating faces designated by reference numerals 33 and 33'. When mating faces 33 and 33' are brought into aligned contact with one another, the interior surface of split ring means segments 30, 32 generally defines a cylinder made up of a plurality of raised threaded sections 34 alternating with undercut sections 36. With the mating faces in contact, threaded sections 34 define an inside diameter which is less than the outside diameter of the respective mating bar member 14. This enables the internal surface of split ring means 28 to function as a tapping die, threading the external surface of the bar member when split ring means 28 is rotated with respect to the bar member while threaded sections 34 are forced into engagement with the outer surface of the bar member. Undercut sections 36 provide room for chips and portions of material cut away as the result of the tapping process which occurs when the threaded sections 34 are rotated in interfering engagement with the external surface of bar members 14. The external surface of split ring means 28 includes a pair of halves of a conical section 38. When mating faces 33, 33' are brought into aligned contact, conic section 38 is defined. The conic section thus defined has its smallest cross-sectional diameter at one end of split ring means 28. At the opposite end, segments 30, 32 provide a shoulder 40. Joining shoulder 40 and conic section 38 is a support plate contact surface 42 which extends generally transverse to the longitudinal axis of split ring means 28. In the embodiment shown, split ring means 28 also has a pair of spanner engagement holes 44 so that the split ring means 28 may be engaged by a spanner wrench for exertion of torques thereon. As will be apparent to those of skill in the art, split ring means 28 should be constructed of material with sufficient hardness and strength to allow threaded sections 34 to cut threads into bar member 14. For example, if conventional galvanized iron pipe were selected for bar member 14, hardened sintered iron could be used to fabricate split ring means 28.

The operation of the apparatus as shown in FIGS. 1–3 will now be briefly described to illustrate the function of individual elements, as well as the improved method of fastening. In the preferred embodiment, each compressible post member 12 will be provided with a pair of support plates 20 with guide holes 22 axially aligned with the clearance holes in post members 12. In fact, support plates 20 may be fastened to the post members remote from the location where final assembly of the playground equipment takes place. Fastening may be accomplished by driving tines 24 into post member 12 or by any other suitable means of fastening. The bar member to be fastened to post member 12 is then placed through clearance hole 18 in the post member 12 and guide holes 22 in the attached support plates so that a portion of the bar member protrudes from both support plates. Then, as shown in FIG. 3, a pair of split ring means 28 are positioned so that conic sections 38 of each engage the periphery of the guide holes in one of support plates 20 placed on either side of post member 12. Split ring means 28 may be tapped slightly with a hammer or otherwise fitted to wedge conical section 38 into engagement with the periphery of the guide holes 22 and to hold mating faces 33, 33' in aligned contact. Wrenches, such as spanner wrenches to be engaged in holes 44 may than be connected to the split ring means 28 on opposite sides of the post member to be fastened. Split ring means 28 are then rotated about the longitudinal axis of the bar member to be fastened in a sense which threads split ring means 28 toward the center of the post member to be fastened. Split ring means 28 threadedly engages and taps a holding thread into the external portion of the bar member to be fastened simultaneously on opposite sides of post member 12. As a result of increasing engagement with the periphery of guide holes 22, each of split ring means 28 exerts a force which tends to put the now-threaded bar member into tension in its section of length internal to the post member and a corresponding compression force is exerted by support plates 20 against post member 12. Further threading and tightening of split ring means 28 may continue with the circle of engagement between guide hole 22 and the split ring means 28 moving up conic section 38 to a section of greater diameter or until the support plate contact surface 42 is brought into contact with its respective support plate. While contact between surfaces 42 and plates 20 is shown in FIG. 3, it is not necessary that such contact occur in order to create an effective connection.

As will be apparent to those skilled in the art, in the embodiment shown in FIGS. 2 and 3 the angle between conic section 38 and the longitudinal axis of the bar member 14 is an important parameter. Too great an angle in the conic section will result in a condition where the torque generated by the spanner wrenches will not result in sufficient force to cut the threads into the bar member at the rate established by the conic section. This will force the portions of split ring means 28 opposite the end of shoulder portion 40 apart and prevent thread cutting. Selection of the proper conic section angle 38 will depend on the depth and type of thread being cut as well as the hardness of the bar member to be fastened. It may also be desirable to select diameters to cut threads of less than standard depth. For example, in one embodiment, the bar member was galvanized steel pipe having a 1 5/16 inch outside diameter threaded with threaded sections 34 which corresponded to those typically used to give a fine thread on 1 ⅜ inch pipe. The material used to construct the split ring means for that embodiment was mild steel and the approximate angle between the longitudinal axis of the bar member and the surface of conic section 38 was approximately 10°. Experience has shown that this angle should be relatively small, less than 15° in most embodiments.

An alternate embodiment of applicant's invention is shown in FIGS. 4 and 5. In those Figures, a support plate 50 of generally rectangular shape with a planar inner contact surface 52 is shown. A support plate of this type might be used in distributing forces on a post member of generally rectangular cross section. Support plate 50 has a guide hole 54. As in the case of guide hole 22 shown in FIGS. 1, 2 and 3, guide hole 54 is placed in alignment with the clearance hole of the post member to which it is affixed. An alternate means of securing the support plate 50 to the post member to provide this alignment includes a plurality of holes 56 through which nails 58 or other connecting elements may be driven to secure support plate 50.

Also shown in FIGS. 4 and 5 is a segmented externally threaded sleeve generally designated 60 shown as a pair of substantially half cylindrical externally threaded segments 62 and 64. Although only two segments are shown in the Figures, a greater number might be used. Sleeve 60, when segments 62 and 64 are brought into aligned contact, defines a hollow right circular cylinder having an externally threaded surface 66. The surface defined by the inner hollow portion carries means for securing the segments to the bar member to prevent movement of the segments axially with respect to the bar when segments 62 and 64 are used in fastening. It will be apparent to those of skill in the art that any number of alternative elements may be employed to achieve axial securing of sleeve 60. Shown in FIGS. 4 and 5, on the inner surface of the segments 62 and 64, are barbs or protrusions 70 and 72, one or more of which may be placed on the inside surface of each segment to provide means for securing each segment to a bar member 14. Also shown in FIGS. 4 and 5 is an internally threaded member or nut 74 of conventional construction. Nut 74 has a threaded inner surface 76 adapted to engage the externally threaded portions 66 of the segmented externally threaded sleeve 60. Nut 74 also has holes 78 for engagement of a spanner wrench. It will be apparent to those skilled in the art that any type of internally threaded member such as a hex nut could be readily substituted for the nut adapted for use with a spanner wrench shown in FIGS. 4 and 5.

The method of fastening using the fastener shown in FIGS. 4 and 5 is essentially the same as that using the embodiment shown in FIGS. 2 and 3. A pair of support plates 50, having guide holes 54 slightly greater in diameter than the outside diameter of the segmented externally threaded sleeve 60, are fastened on opposite sides of clearance hole 18 in post member 12. Either by light tapping, threading an internally threaded member onto sleeve 60 while it is in contact with the bar member, or other suitable steps, protrusions 70, 72 are brought into contact with the external surface of the bar member and become embedded therein. This causes segments 62 and 64 to be axially secured on the sleeve. Two sleeves 60 are secured on the bar member so that a portion of each sleeve 60 extends into an associated guide hole, while a portion of a sleeve protrudes therefrom on opposite sides of post member 12. A pair of nuts 74 are then threaded, one on each sleeve, on opposite sides of the post member. Simultaneous tightening continues until a face of each of nuts 74 contacts an associated support plate 50. Further tightening of the nuts causes bar members 14 to experience a tension force, while post member 12 is brought into compression by a force distributed by support plates 50.

In situations where a connection to the end of a bar member is desired, it may be perfectly acceptable to weld or otherwise fasten one end of the bar member to a support plate or other means to axially secure the bar member in one direction when it is strung through the clearance hole in the post member to be fastened. To provide secure fastening in such a situation, only one set of fastening elements of the present invention need be used rather than a pair of fastening elements on opposite sides of the post member.

From the foregoing description it is apparent that there has been provided, in accordance with the invention, a basic unit of construction for use in playground equipment as well as a method of fastening playground equipment together that fully satisfies the objects, aims and advantages set forth. While the invention has been described in conjunction with specific embodiments, it is evident that many alternatives, modifications and variations will be apparent to those skilled in the art in the light of the foregoing description. Accordingly, all such alternatives, modifications and variations as fall within the spirit and broad scope of the appended claims are covered.

I claim:

1. A basic unit of construction for use in playground equipment, comprising:
    a. a compressible post member having a clearance hole therethrough for receipt of a bar member;
    b. a bar member received into the clearance hole in said post member;
    c. retaining means engaging one side of said post member and said bar member for preventing said bar member from being withdrawn from said clearance hole from the opposite side of said post member;
    d. a first support plate, placed in contact with said post member between said retaining means and said post, having a guide hole substantially axially aligned with said clearance hole, said bar member extending through said clearance hole;
    e. first split ring means having an external surface bearing against and adapted to rotate with respect to the periphery of said guide hole, said split ring means threadedly engaging said bar member; and
    f. means for preventing relative rotation between said first support plate and said post member, whereby rotation of said split ring means in one sense forces said first support plate toward said fixed means.

2. The apparatus of claim 1 wherein said bar member extends completely through said post member, and said retaining means includes a second support plate in contact with the side of said post member opposite said first support plate and having a guide hole substantially axially aligned with said clearance hole, and second split ring means threadedly engaging the bar member and having an external surface bearing against and adapted to rotate with respect to the periphery of the guide hole of said second plate.

3. The apparatus of claim 1 wherein a portion of the external surface of said first split ring means bearing against the periphery of said guide hole is a section of a conical surface.

4. The apparatus of claim 3 wherein a portion of the external surface of said first split ring means defines a shoulder with a support plate contact surface connecting said shoulder to the conical section at the greatest cross-section thereof, and said support plate contact surface is an annular surface extending generally transversely of the longitudinal axis of said bar member.

5. The apparatus of claim 3 wherein said first split ring means has an inner surface including a plurality of threaded sections which alternate with a plurality of longitudinally grooved sections.

6. The apparatus of claim 5 wherein said first split ring means comprises two segments having mating faces which, when brought into aligned contact, define an element of generally cylindrical shape.

7. The apparatus of claim 6 wherein said first support plate has an inner surface generally conforming to the shape of the compressible post member in the vicinity of the clearance hole therein and has the corners thereof formed to provide protrusions securing said support plate to said post member and aiding to prevent relative rotation between said support plate and said post member.

8. A basic unit of construction for use in playground equipment, comprising:
   a. a compressible post member having a clearance hole therethrough for receipt of a bar member;
   b. a bar member received into the clearance hole in said post member;
   c. fixed means engaging a first side of said post member and said bar member for preventing said bar member from being withdrawn from said clearance hole in one direction;
   d. a first support plate, placed in contact with said post member on a side opposite said first side, and having a guide hole substantially axially aligned with said clearance hole, said bar member extending through said guide hole;
   e. means preventing relative rotation between said post member and said first support plate;
   f. a first segmented externally threaded sleeve;
   g. means securing the segments of said sleeve to said bar preventing movement of said segments axially with respect to said bar at a position thereon at which a portion of said sleeve protrudes from said post member and said support plate; and
   h. a first internally threaded member threadedly engaging said sleeve and bearing against said support plate, whereby rotation of said first internally threaded member forces said support plate toward said fixed means.

9. The apparatus of claim 8 wherein said fixed means includes a second support plate adjacent to said post member with a guide hole substantially axially aligned with said clearance hole, a second segmented externally threaded sleeve, means securing the segments of said sleeve to said bar in the vicinity of said second support plate to prevent movement of said segments axially with respect to said bar, and a second internally threaded member threadedly engaging said second sleeve and bearing against said second support plate.

10. The apparatus of claim 8 wherein said segmented sleeve is substantially a hollow right circular cylinder in shape and comprises a pair of half round segments, each of which has an inner surface containing at least one protrusion for piercing engagement of the external surface of said bar member.

11. Fastening apparatus for use in park and playground equipment to fasten a circular pipe which passes through a clearance hole in a wood support post to the post, comprising:
   a. a pair of support plates, each of which has a surface generally conforming to the shape of the post in the area where the pipe enters the hole therein, each plate having a substantially circular guide hole through which the pipe may pass;
   b. means securing the support plates to opposite sides of said support post with their respective guide holes in substantial alignment with said clearance hole; and
   c. a pair of longitudinally extended split rings, each having an inner surface with tapping threads, and an outer surface at least a portion of which is a conic section, said split rings positioned on opposite sides of said post with their inner surfaces threadedly engaging the external surface of said pipe and each of their conical outer surfaces bearing against the periphery of the circular hole in the support plate with which each is associated.

12. A method of fastening a circular pipe to a post having a clearance hole drilled therethrough for receiving said pipe for use in playground equipment, comprising:
   a. bringing a pair of support plates with guide holes of predetermined diameter into contact with on opposite side of the post so that the guide holes are aligned on the axis of the clearance hole in the post;
   b. placing the pipe through said hole with portions thereof protruding from both sides of the post;
   c. wedging the segments of each of a pair of segmented longitudinally extended internally threaded rings having an external conical portion into a guide hole in each of the plates; and
   d. rotating the rings with respect to one another and with respect to said support plates in a direction which advances each ring toward its respective support plate, thereby also threading said pipe.

13. The method of claim 12 wherein the step of bringing the pair of support plates into contact with the post includes the substep of securing the support plates to the post with the guide holes thereof in substantial axial alignment with the clearance hole.

* * * * *